(12) United States Patent
Lin

(10) Patent No.: US 7,597,836 B2
(45) Date of Patent: Oct. 6, 2009

(54) MOLD APPARATUS AND METHOD FOR INJECTION MOLDING

(75) Inventor: Hou-Yao Lin, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 12/182,376

(22) Filed: Jul. 30, 2008

(65) Prior Publication Data

US 2009/0212461 A1 Aug. 27, 2009

(30) Foreign Application Priority Data

Feb. 22, 2008 (CN) .................. 2008 1 0300387

(51) Int. Cl.
*B29C 45/23* (2006.01)
(52) U.S. Cl. .................. 264/328.8; 425/562; 425/572
(58) Field of Classification Search ................ 425/562, 425/572; B29C 45/23
See application file for complete search history.

(56) References Cited

U.S. PATENT DOCUMENTS

| 3,120,680 | A | * | 2/1964 | Villasana | .................. | 249/110 |
| 4,909,725 | A | * | 3/1990 | Ward | .................. | 425/562 |
| 5,208,053 | A | * | 5/1993 | Vandenberg | .................. | 425/572 |
| 5,849,236 | A | * | 12/1998 | Tatham | .................. | 264/297.2 |

* cited by examiner

*Primary Examiner*—Joseph S. Del Sole
*Assistant Examiner*—James Sanders
(74) *Attorney, Agent, or Firm*—Andrew C. Cheng

(57) ABSTRACT

A mold apparatus includes a first mold core, a second mold core, a sprue, a first insert, and a second insert. The first and second mold cores cooperatively define a first mold chamber, a second mold chamber, a first runner connected to the first mold chamber, and a second runner connected to second mold chamber. The sprue bushing has a sprue, a first guiding groove, and a second guiding groove. The first and second guiding grooves are configured for guiding molten material from the sprue to the respective first and second runners. The first and second guiding grooves each have a recess. The first insert has a protruded end portion. The second insert has a recessed end portion. The first and second inserts are inserted into the first or second recess, thereby blocking the corresponding first or second runner or compensating the corresponding first or second recess.

9 Claims, 5 Drawing Sheets

MOLD APPARATUS AND METHOD FOR INJECTION MOLDING

BACKGROUND

1. Technical Field

The present invention relates to a mold apparatus with multi-molding chambers and a method for injection molding using the mold apparatus.

2. Description of Related Art

Injection molding has been widely used for manufacturing plastic, vitreous, or metal articles.

A typical mold apparatus for injection molding, includes a number of molding chambers and a number of runners each connected to a molding chamber. The runners are all connected to a sprue provided by a sprue bushing connected to an injection machine. Molten materials is injected into the sprue and then guided into the molding chambers via the runners.

However, when a molding chamber is not needed or when a molding chamber is not in a condition for injection molding, for example, one of the molding chambers needs to be repaired, the whole mold apparatus cannot be used.

Therefore, a mold apparatus and a method for injection molding using the mold apparatus is desired to overcome the above-described deficiencies.

SUMMARY

A mold apparatus includes a first mold core, a second mold core, a sprue bushing, a first insert, and a second insert. The first mold core defines a through hole, a first cavity, a second cavity, a first sub-runner connected to the first cavity, and a second sub-runner connected to the second cavity. The second mold core defines a third cavity, a fourth cavity, a third sub-runner connected to the third cavity, and a fourth sub-runner connected to the fourth cavity. The sprue bushing is received in the through hole of the first mold core. The sprue bushing has a sprue, a first guiding groove connecting the sprue with the first sub-runner, a second guiding groove connecting the sprue with the second sub-runner, a first recess defined in the first groove and configured for receiving a first insert, and a second recess defined in the second groove and configured for receiving a second insert. The first insert has a protruded end portion and the second insert has a recessed end portion. The first cavity and the third cavity form a first molding chamber. The second cavity and the fourth cavity form a second molding chamber. The first sub-runner, the first guiding groove and the third sub-runner cooperatively form a first runner. The second sub-runner, the second guiding groove and the fourth sub-runner cooperatively form a second runner. The protruded end portion of the first insert is configured to protrude into the first recess or second recess, thereby preventing the sprue from communicating with the first molding chamber or the second molding chamber, respectively. The recessed end portion of the second insert is configured to compensate the first recess or second recess and to communicate the first molding chamber or the second molding chamber with the sprue.

Other advantages and novel features of the present mold apparatus will become more apparent from the following detailed description of embodiment when taken in conjunction with the accompanying drawings.

BRIEF DESCRIPTION OF THE DRAWINGS

Many aspects of the mold apparatus and method using same can be better understood with reference to the following drawings. The components in the drawings are not necessarily drawn to scale, the emphasis instead being placed upon clearly illustrating the principles of the present mold apparatus and method using same. Moreover, in the drawings, like reference numerals designate corresponding parts throughout the several views.

DETAILED DESCRIPTION OF THE EMBODIMENTS

Embodiments of a mold apparatus and a method for injection molding using the mold apparatus will now be described in detail below and with reference to the drawings.

Figure 1:
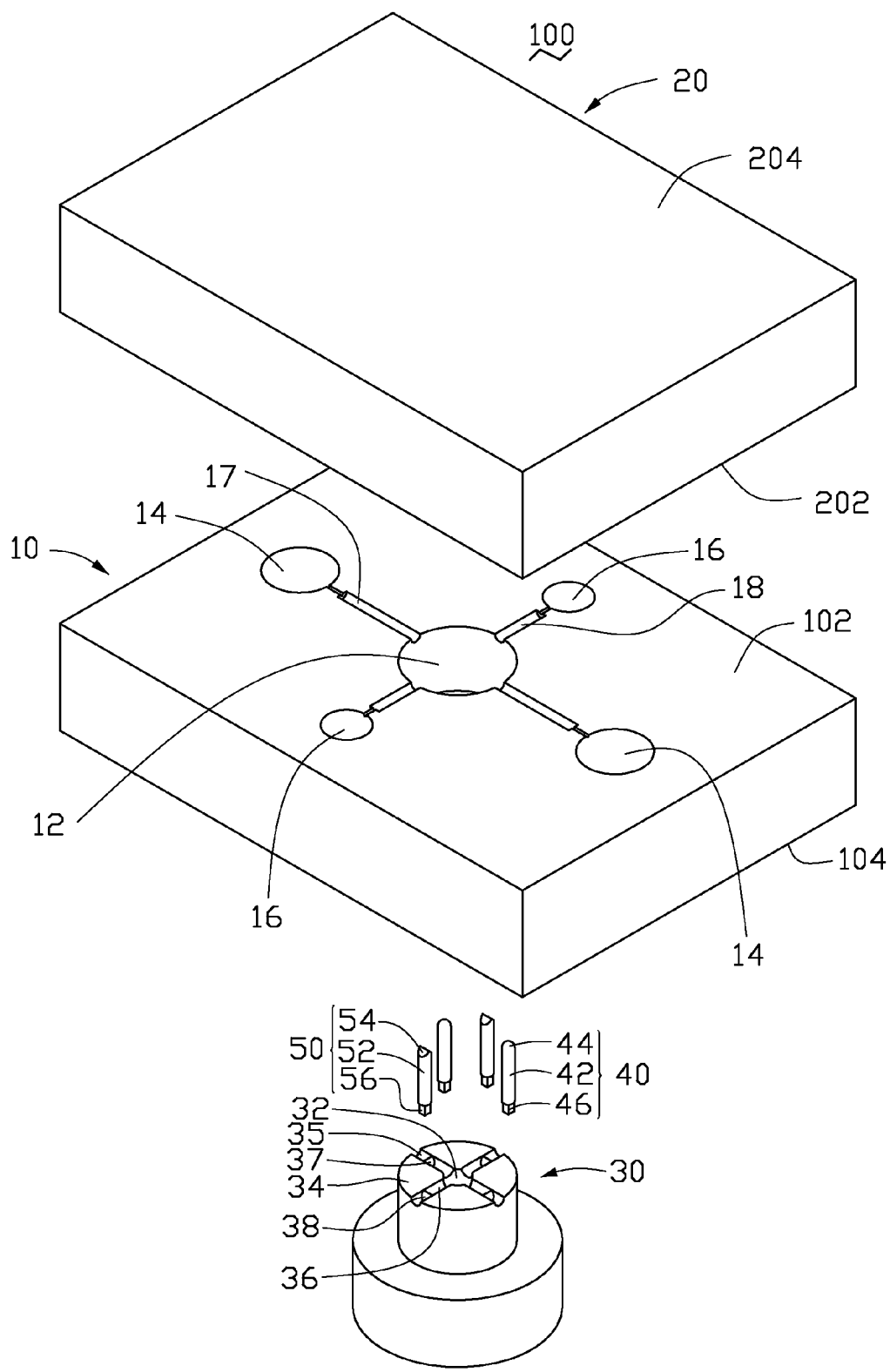
FIG. 1 is an exploded isometric view of an embodiment of a mold apparatus, the mold apparatus includes a first mold core and a second mold core

Referring to FIG. 1, a mold apparatus 100 includes a first mold core 10, a second mold core 20, a sprue bushing 30, two first inserts 40, and two second inserts 50.

The first mold core 10 has a first surface 102 and an opposite second surface 104. The first surface 102 faces the second mold core 20, and serves as a parting surface. The first mold core 10 defines a through hole 12 at a central portion, two identical first cavities 14, two identical second cavities 16, two first sub-runners 17, and two second sub-runners 18 formed in the first surface 102. The two first cavities 14 are arranged in a first line. The two second cavities 16 are arranged in a second line perpendicular to the first line. The first cavities 14 and the second cavities 16 may be shaped differently. The two first sub-runners 17 interconnect the two first cavities 14 to the through hole 12. The two second sub-runners 18 interconnect the two second cavities 16 to the through hole 12. Each of the first sub-runners 17 and second sub-runners 18 has a semi-cylindrical shape.

Figure 2:
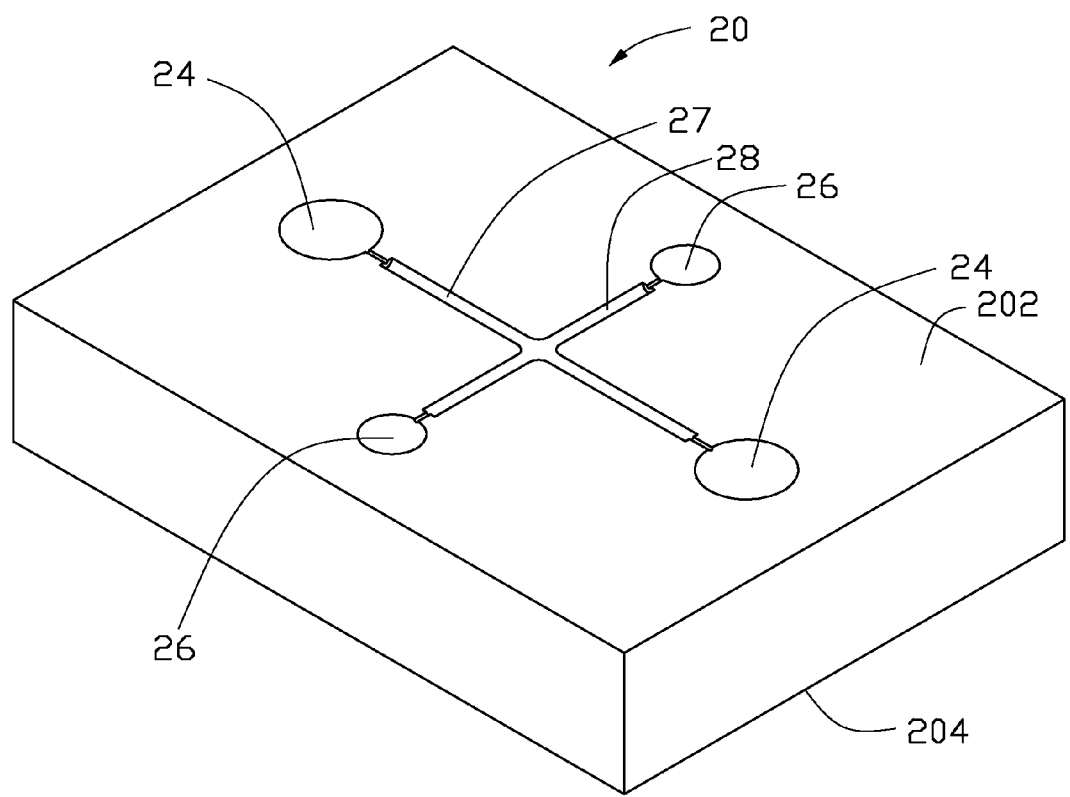
FIG. 2 is an isometric view of the second mold core of the mold apparatus of FIG. 1, but viewed from another aspect.

Also Referring also to FIG. 2, the second mold core 20 has a third surface 202 and an opposite fourth surface 204. The third surface 202 faces the first mold core 10 and serves as a parting surface. The second mold core 20 defines two identical third cavities 24, two identical fourth cavities 26, two third sub-runners 27, and two fourth sub-runners 28 formed in the third surface 202. The two third cavities 24 are arranged in a third line. The two fourth cavities 26 are arranged in a fourth line perpendicular to the third line. The third cavities 24 and the fourth cavities 26 may be shaped differently. The two third sub-runners 27 interconnect the two third cavities 24. The two fourth sub-runners 28 interconnect the two fourth cavities 26. Each of the third sub-runners 17 and fourth sub-runners 18 has a semicylindrical shape.

Figure 3:
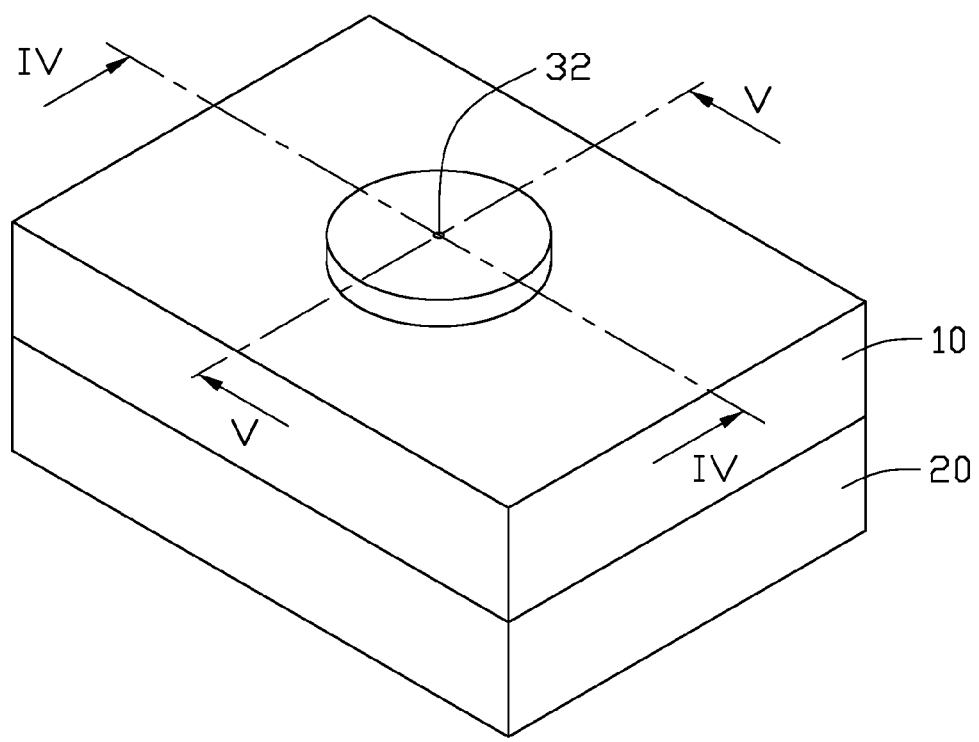
FIG. 3 is an assembled isometric view of the mold apparatus of FIG. 1.

Also referring to FIG. 3, the through hole 12 is configured to receive the sprue bushing 30. The through hole 12 may be stepped cylindrical shaped to receive the sprue bushing 30. The sprue bushing 30 has an exit surface 34 facing the second mold core 20. The sprue bushing 30 is stepped cylindrical shaped. The sprue bushing 30 defines a sprue 32 extending through the sprue busing 30. The sprue bushing 30 defines two first guiding grooves 35 and two second guiding grooves 36 formed in the exit surface 34. The two first guiding grooves 35 are arranged in a fifth line. The two second guiding grooves 36 are arranged in a sixth line perpendicular to the fifth line.

The sprue bushing 30 defines two first recesses 37 and two second recesses 38, each first recess 37 is formed in each first guiding groove 35, and each second recess 38 is formed in each second guiding groove 36. Each first guiding groove 35 and each second guiding grooves 36 is semi-cylindrical shaped.

Figure 4:
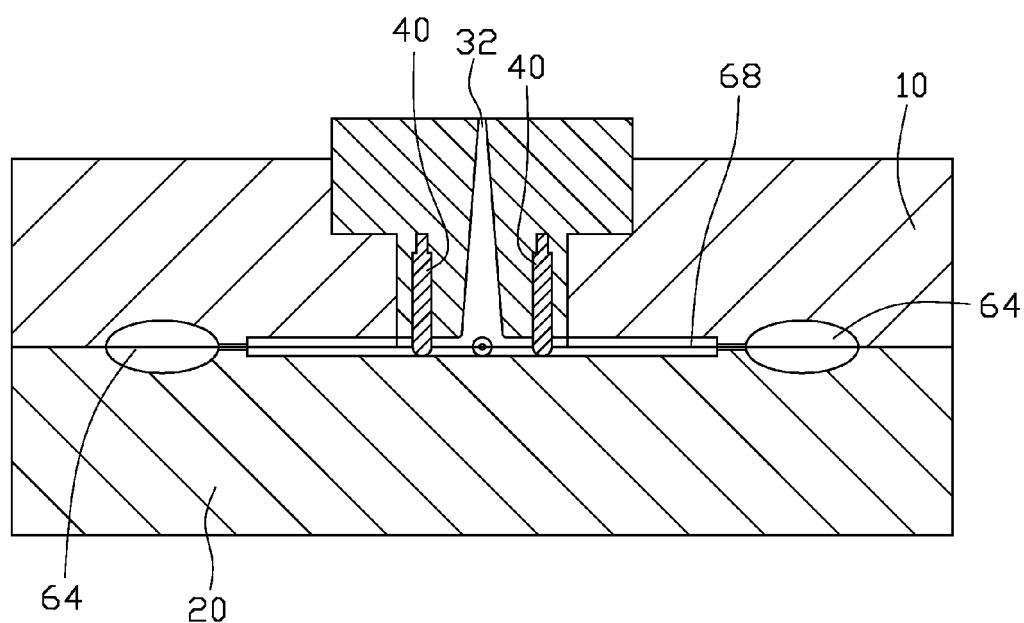
FIG. 4 is a cross-sectional view of the mold apparatus of FIG. 3, taken along a line IV-IV.

Also referring to FIG. 4, each first recess 37 comprises a bottom rectangular portion and a top cylindrical portion in communication with the respective first guiding grooves 35. The top cylindrical portion of each first recess 37 has a diameter equal to a diameter of the first guiding grooves 35.

Figure 5:
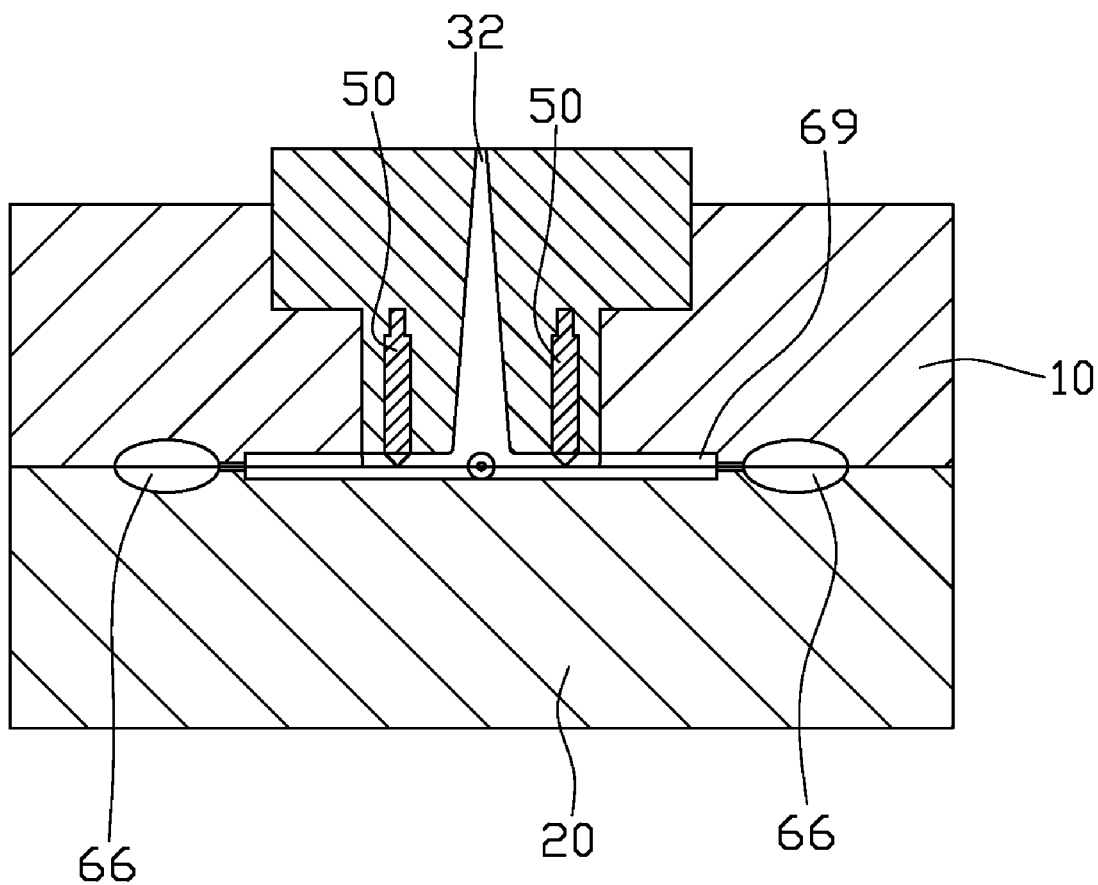
FIG. 5 is a cross-sectional view of the mold apparatus of FIG. 3, taken along a line V-V.

Also referring to FIG. 5, each second recess 38 comprises a bottom rectangular portion and a top cylindrical portion in communication with the respective second guiding grooves 36. The top cylindrical portion of each second recess 38 has a diameter equal to a diameter equal to a diameter of the second guiding grooves 36.

When the second mold core 20 is coupled to the first mold core 10, each first cavity 14 and each corresponding third cavity 24 cooperatively form a first molding chamber 64, and each second cavity 16 and each corresponding fourth cavity 26 cooperatively form a second molding chamber 66. The first molding chambers 64 and the second molding chambers 66 may be shaped differently to mold different workpieces. Each first sub-runner 17, each corresponding first guiding groove 35, and each corresponding third sub-runners 27 cooperatively form a cylindrical first runner 68. Each second sub-runner 18, each corresponding second guiding groove 36, and each corresponding fourth sub-runners 28 cooperatively form a cylindrical second runner 69.

Each first insert 40 includes a top cylindrical body 42 and a bottom rectangular body 46. Each top cylindrical body 42 includes a protruded end portion 44. When the two first inserts 40 are inserted into the respective two first recesses 37, the protruded end portions 44 engage with the respective first runners 68, thereby preventing the sprue 32 from communicating with the first molding chambers 64 by blocking the first runners 68. The bottom rectangular bodies 46 locate the first inserts 40 in the corresponding first recesses 37.

Each second insert 50 includes a top cylindrical body 52 and a bottom rectangular body 56. Each top cylindrical body 52 includes a recessed end portion 54. When the two second inserts 50 are inserted into the respective two second recesses 38, the recessed end portions 46 compensate the respective second recesses 38 and allow the respective second molding chambers 66 to communicate with the sprue 32. The bottom rectangular bodies 56 locate the second inserts 50 in the second recesses 38.

In another embodiment, the first insert 40 may be inserted into the second recess 38, thereby preventing the sprue 32 from communicating with the corresponding second molding chamber 66. In addition, the second insert 50 may be inserted into the first recess 37, thereby compensating the corresponding first recess 37 and allowing the corresponding first molding chamber 64 to communicate with the sprue 32.

A method for injection molding using the mold apparatus 100, can be described in the numbered blocks below. Depending on the embodiment, certain of the blocks described below may be removed, others may be added, and the sequence of blocks may be altered. The method comprises:

(1) selecting which of the first molding chambers 64 or, the second molding chambers 66, or both the first and second molding chambers 64, 66 are to be used for injection molding;

(2) identifying which of the first and second molding chambers 64, 66 is an unused chamber and a selected chamber;

(3) inserting a first insert 40 into the first or second recess 37, 38 to block the corresponding first or second runner 68, 69 and to separate the unused chamber from the sprue 32, or inserting a second insert 50 into the first or second recess 37, 38 to compensate the other recess and to communicate the selected chamber with the sprue 32; this block is repeated for each first or second recess 37, 38; and (4) coupling the first and second mold cores 10, 20 to perform the injection molding.

According to the present embodiment, two kinds of inserts are introduced. The two kinds of inserts are received in the sprue bushing, and configured for blocking or compensating the runners. In this way, the molding chambers can be selectively used in injection molding.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A mold apparatus, comprising:
   a first mold core defining a through hole, a first cavity, a second cavity, a first sub-runner connected to the first cavity, and a second sub-runner connected to the second cavity;
   a second mold core defining a third cavity, a fourth cavity, a third sub-runner connected to the third cavity, and a fourth sub-runner connected to the fourth cavity;
   a first insert having a protruded end portion;
   a second insert having a recessed end portion;
   a sprue bushing received in the through hole, the sprue bushing having:
      a sprue extending through the sprue bushing;
      a first guiding groove connecting the sprue with the first sub-runner;
      a second guiding groove connecting the sprue with the second sub-runner;
      a first recess configured for receiving a first insert or a second insert, the first recess is defined in the first guiding groove; and
      a second recess configured for receiving a first insert or a second insert, the second recess is defined in the second guiding groove;
   wherein the first cavity and the third cavity form a first molding chamber; the second cavity and the fourth cavity form a second molding chamber; the first sub-runner, the first guiding groove and the third sub-runner cooperatively form a first runner; the second sub-runner, the second guiding groove and the fourth sub-runner cooperatively form a second runner; the protruded end portion of the first insert is configured to protrude into the first recess or second recess, thereby preventing the sprue from communicating with the first molding chamber or the second molding chamber, respectively; the recessed end portion of the second insert is configured to compensate the first recess or second recess and to communicate the first molding chamber or the second molding chamber with the sprue.

2. The mold apparatus of claim 1, wherein the first molding chamber and the second molding chamber are shaped differently; the first molding chamber, the second molding chamber, and the sprue are not arranged in a line.

3. The mold apparatus of claim 1, wherein the first molding chamber and the second molding chamber are similarly shaped; the first molding chamber, the second molding chamber, and the sprue are arranged in a line.

4. The mold apparatus of claim 1, wherein the first sub-runner, the second sub-runners, the first guiding groove, and the second guiding grooves each are semi-cylindrical shaped.

5. The mold apparatus of claim 4, wherein the first and second recesses each are comprised of a top cylindrical portion and a bottom rectangular portion, the top cylindrical portions is in communication with the respective first and second guiding grooves, a diameter of each of the top cylindrical portions is equal to a diameter of the corresponding first and second guiding grooves.

6. The mold apparatus of claim 5, wherein the first and second inserts each have a top cylindrical body and a bottom rectangular body to engage in the first and second recesses.

7. A method for injection molding, comprising:
providing a first mold core and a second mold core, the first and second mold core cooperatively define a first molding chamber, a second molding chamber, a first runner connected to the first molding chamber, and a second runner connected to the second molding chamber;
providing a sprue bushing having a sprue extending through the sprue bushing, a first guiding groove, a second guiding groove, the first and second guiding grooves are configured for guiding material from the sprue to the respective first and second runners, the first and second guiding grooves each having a recess;
selecting the first molding chamber, the second molding chamber, or both the first and second molding chambers to be ready for injection molding;
identifying which of the first and second molding chambers is an unused chamber and a selected chamber; and
inserting a first insert into the first or second recess to block the corresponding first or second runner and to separate the unused chamber from the sprue; or inserting a second insert into the first or second recess to compensate the first or second recess and to communicate the selected chamber with the sprue.

8. The method of claim 7, wherein the first insert has a protruded end portion to block the first or second runner.

9. The method of claim 7, wherein the second insert has recessed end portion to compensate the first or second recess.

* * * * *